United States Patent
Rossetti

(10) Patent No.: US 10,837,518 B2
(45) Date of Patent: Nov. 17, 2020

(54) THREADED CABLE TIE MOUNTING ADAPTER

(71) Applicant: AttachMount, LLC, Wixom, MI (US)

(72) Inventor: Brian J. Rossetti, Wixom, MI (US)

( * ) Notice: Subject to any disclaimer, the term of this patent is extended or adjusted under 35 U.S.C. 154(b) by 0 days.

(21) Appl. No.: 16/751,435

(22) Filed: Jan. 24, 2020

(65) Prior Publication Data

US 2020/0240489 A1 Jul. 30, 2020

Related U.S. Application Data

(60) Provisional application No. 62/796,577, filed on Jan. 24, 2019.

(51) Int. Cl.
*F16G 11/14* (2006.01)
*F16B 9/00* (2006.01)
*B65D 63/10* (2006.01)

(52) U.S. Cl.
CPC ............. *F16G 11/14* (2013.01); *F16B 9/054* (2018.08); *B65D 63/1027* (2013.01)

(58) Field of Classification Search
CPC ......... F16G 11/14; B65D 63/027; F16B 9/054
See application file for complete search history.

(56) References Cited

U.S. PATENT DOCUMENTS

| 3,632,071 A * | 1/1972 | Cameron | F16L 3/08 |
| | | | 248/74.3 |
| 6,533,226 B2 * | 3/2003 | Geiger | F16L 3/233 |
| | | | 248/68.1 |
| 2013/0153737 A1 * | 6/2013 | Zoeteman | A45B 11/00 |
| | | | 248/513 |
| 2016/0047494 A1 * | 2/2016 | Dickinson | F16B 1/00 |
| | | | 248/74.2 |
| 2019/0137011 A1 * | 5/2019 | Sylvester | F16L 3/221 |

* cited by examiner

*Primary Examiner* — Anita M King
(74) *Attorney, Agent, or Firm* — Robinson IP Law, PLLC

(57) ABSTRACT

A cable tie mount for supporting an object, the cable tie mount includes: a body including a mounting face formed on a first side of the body, a threaded bore formed in a second opposing side of the body, and a first cable tie passage formed on the body and configured to receive a cable tie therethrough; and a support portion including a threaded portion extending therefrom and configured to threadably engage the threaded bore formed in the second opposing side of the body. The body is configured to mount to the object with one or more cable ties, and wherein the body is configured to be threadably secured to the support portion for supporting the object mounted on the body at a desired location.

11 Claims, 4 Drawing Sheets

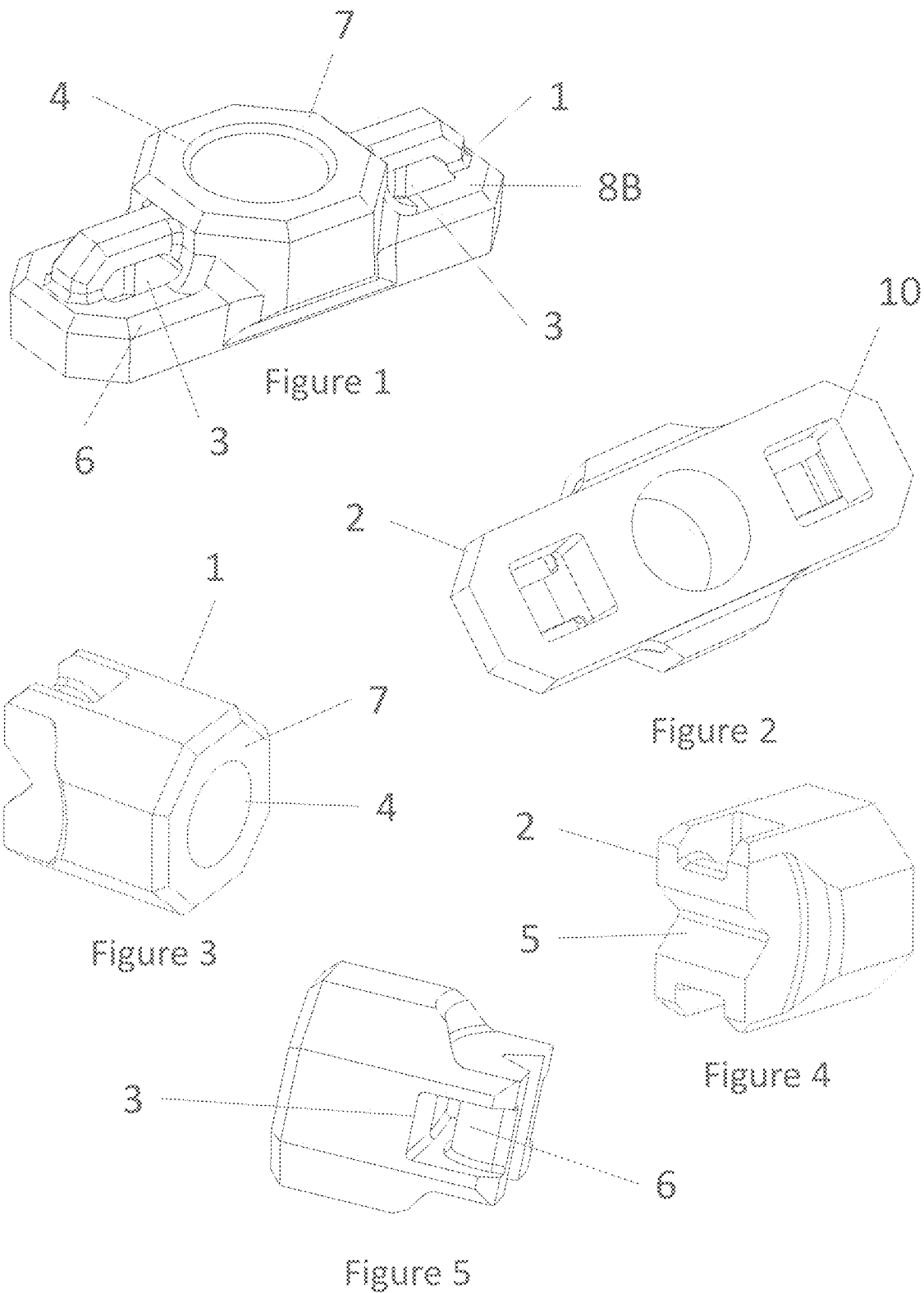

THREADED CABLE TIE MOUNTING ADAPTER

CROSS-REFERENCE TO RELATED APPLICATION

This application claims priority to and is a non-provisional of U.S. Provisional Patent Application Ser. No. 62/796,577 for a "Threaded Cable Tie Mounting Adapter" filed on Jan. 24, 2019, the contents of which are incorporated herein by reference in its entirety.

FIELD

This disclosure relates to the field of mounting devices. More particularly, this disclosure relates to a cable tie mount for removably mounting objects on a surface.

BACKGROUND

Many consumer products lack convenient mounting options to allow for hands-free use. Most flashlights for instance are generally meant to be handheld. Lanyard holes and holsters for these items have limitations. When performing some tasks that require 2 hands and light, a flashlight may be held in the hand of another person which is inconvenient, is sometimes shaky, and the light beam is usually not pointed in the correct direction. Propping the light up on an object or setting it on the ground at a less than ideal orientation is not effective. Physically modifying the flashlight to allow for other mounting configurations, by drilling a hole for hanging for instance, can be destructive and usually can't be unmodified. Duct tape or other options are crude and can further be destructive to an underlying surface.

What is needed, therefore, is a cable tie mount for removably mounting objects on a surface.

SUMMARY

The above and other needs are met by an apparatus a cable tie mount for removably mounting objects on a surface. In a first aspect, a cable tie mount includes: a body including a mounting face formed on a first side of the body, a threaded bore formed in a second opposing side of the body, and a first cable tie passage formed on the body and configured to receive a cable tie therethrough; and a support portion including a threaded portion extending therefrom and configured to threadably engage the threaded bore formed in the second opposing side of the body. The body is configured to mount to the object with one or more cable ties, and wherein the body is configured to be threadably secured to the support portion for supporting the object mounted on the body at a desired location.

In one embodiment, the support comprises a magnet. In another embodiment, the magnet is coated with one of a rubber or polymer material.

In yet another embodiment, the cable tie mount further includes a second cable tie passage. In one embodiment, the first cable tie passage and the second tie passage are located on opposing sides of the threaded bore formed in the second opposing side of the body. In yet another embodiment, the first cable tie passage including a top portion, a bottom portion, and opposing side portions for securing a cable tie within the first cable tie passage.

In one embodiment, the support portion is one of a threaded eye hook, threaded eye bolt, a threaded bolt, a threaded magnet.

In another embodiment, the mounting face is substantially planar. In yet another embodiment, the mounting face is substantially contoured such that the mounting face conforms to a shape of the object. In one embodiment, the mounting face further includes a groove arranged along a length of the mounting face.

In a second aspect, a cable tie mount for supporting an object includes: a body including a mounting face formed on a first side of the body, a threaded bore formed in a second opposing side of the body, a first cable tie passage formed on the body on a first side of the threaded bore and configured to receive a first cable tie therethrough, and a second cable tie passage formed on the body on a second side of the threaded bore and configured to receive a second cable tie therethrough; and a support portion including a threaded portion extending therefrom and configured to threadably engage the threaded bore formed in the second opposing side of the body. The body is configured to mount to the object with one or more cable ties, and wherein the body is configured to be threadably secured to the support portion for supporting the object mounted on the body at a desired location.

In a third aspect, a cable tie mount for supporting an object includes: a body including a mounting face formed on a first side of the body, a threaded bore formed in a second opposing side of the body, a first cable tie passage formed on the body on a first side of the threaded bore and configured to receive a first cable tie therethrough, and a second cable tie passage formed on the body on a second side of the threaded bore and configured to receive a second cable tie therethrough; and a support portion including a magnet and a threaded portion extending therefrom and configured to threadably engage the threaded bore formed in the second opposing side of the body. The body is configured to mount to the object with one or more cable ties, and wherein the body is configured to be threadably secured to the support portion for supporting the object mounted on the body at a desired location.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 1 shows is a perspective view of the top or threaded side of the threaded cable tie mounting adapter with multiple cable tie mounting holes including a hole in which a threaded feature may be attached according to one embodiment of the present disclosure;

FIG. 2 shows a perspective view of a bottom or object mounting side of the threaded cable tie mounting adapter with multiple cable tie mounting holes including surface where the threaded cable tie mounting adapter mates to an object according to one embodiment of the present disclosure;

FIG. 3 shows a perspective view of the top or threaded side of the threaded cable tie mounting adapter with a single cable tie hole including a threaded feature according to one embodiment of the present disclosure;

FIG. 4 shows a perspective view of the bottom or object mounting side of a threaded cable tie mounting adapter with a single cable tie hole including a surface where the threaded cable tie mounting adapter mates to an object and a vee groove according to one embodiment of the present disclosure;

FIG. 5 shows a perspective view of the side of a threaded cable tie mounting adapter with a single cable tie hole including a cable tie passage according to one embodiment of the present disclosure;

DETAILED DESCRIPTION

Figure 6:
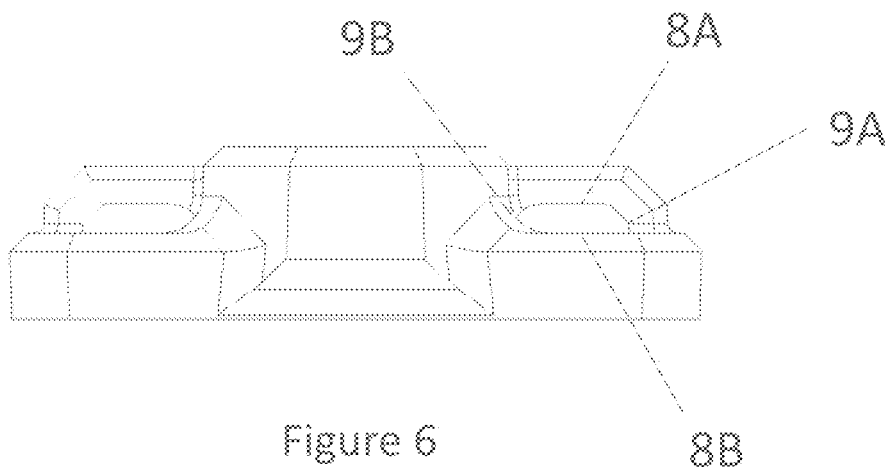
FIG. 6 shows a side view of a threaded cable tie mounting adapter with multiple cable tie mounting holes according to one embodiment of the present disclosure.
Figure 7:
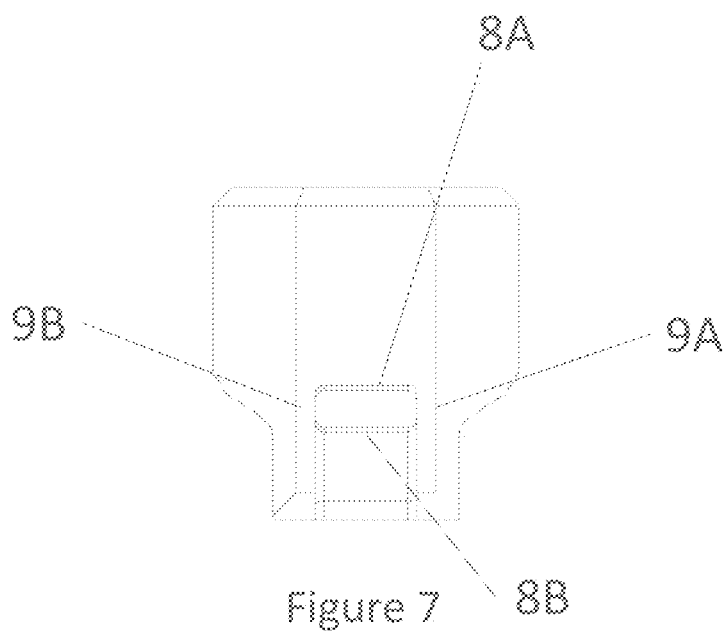
FIG. 7 shows a side view of a threaded cable tie mounting adapter with a single cable tie hole according to one embodiment of the present disclosure.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

FIG. 1 shows a basic embodiment of a cable tie mounting adapter. The cable tie mounting adapter includes a body 1 that is compact in size as to be less obtrusive as to not hinder normal operation of a device on which the cable tie mounting adapter is mounted. The body 1 is robust such that the body 1 will withstand typical forces imposed upon the body by a weight of an attached item, or torque imposed by a user during use and the pull force of a magnet as described in greater detail below. The cable tie mounting adapter can be manufactured by various suitable manufacturing methods. In one embodiment, a threaded cable tie mounting adapter may be manufactured by a casting process, in another embodiment, a threaded cable tie mounting adapter may be made by an injection molding process, in yet another embodiment of a threaded cable tie mounting adapter may be produced by other current machining processes, in a further embodiment, a threaded cable tie mounting adapter may be made by the 3D printing or additive manufacturing process. The body 1 of the threaded cable tie mounting adapter can be produced from various suitable materials.

In one embodiment, the body 1 may be made from a metal such as aluminum or steel. In another embodiment, a threaded cable tie mounting adapter may be formed of more than one material. For example, plastic, foam, or rubber materials may be used. At one end of the body 1 is a mounting face 2. In one embodiment, the mounting face 2 may be a single surface. In another embodiment, the mounting face 2 may be a plurality of surfaces. In one embodiment the mounting face 2 may be substantially planar. In another embodiment, the mounting face 2 may have a cylindrical, concave, convex or other shape such that the mounting face 2 substantially conforms to a shape of an object on which the body 1 is mounted. The mounting face 2 may be interrupted by a groove 5 that may be arranged towards a center and along a length of the mounting face 2. In one embodiment, the groove 5 may be formed of 2 surfaces at a 90-degree vee shape angle to each other and at a 45-degree angle to the mounting face 2. The groove 5 may be located towards a center plane of a threaded feature 4 axis. A face where a threaded feature originates 7 may be at an end opposite of the mounting face 2. The threaded feature origin face 7 is where the threaded feature 4 originates. In one embodiment, the axis of the threaded feature 4 is located perpendicular to the threaded feature face 7. In another embodiment, the axis of the threaded feature 4 is located at an angle relative to the threaded feature origin face 7. The threaded feature 4 is located on the body 1 as shown in FIGS. 1-5.

In one embodiment, the threaded feature 4 may be a molded-in threaded insert or a pressed-in threaded insert. In another embodiment, the threaded feature 4 may be integral to the body 1. In one embodiment, the threaded feature 4 may have locking threads that prevent loosening of the threaded object inserted into it. The threaded feature 4 could then accept a mating threaded item such as a threaded eye hook, threaded eye bolt, a threaded bolt, a threaded magnet or other threaded items. In one embodiment, a thread size that is common in industry, such as a quarter inch by 20 threads per inch or SAE ¼-20 may be present. In another embodiment, a different thread size may be utilized.

In one embodiment, the cable tie mounting adapter has a single cable tie passage 3. In another embodiment, the cable mount has a plurality of cable tie passages 3 for receiving of a plurality of cable ties. The cable tie passage 3 may be rectangular in shape. The cable tie passage 3 allows for the passage of a cable tie for the purpose of securing the cable tie mounting adapter to an object. The cable tie passage 3 creates a constraint that guides and holds the cable tie in place and to prevent the cable tie from slipping off of or otherwise disengaging the body 1. The cable tie passage 3 has a top 8A and bottom 8B which may be parallel relative to each other and that may further be parallel to the mounting face 2. The top 8A and bottom 8B of the cable tie passage 3 are sized large enough to allow a flat element of a typical cable tie to pass thru. The cable tie passage 3 generally has left 9A and right 9B opposed sides that are perpendicular to the top 8A and bottom 8B of the cable tie passage 3. The left 9A and right 9B opposed sides prevent a cable tie from slipping off and out of the cable tie passage. A width of the cable tie passage 3 between sides 9A and 9B is wide enough to allow a width of a typical cable tie to pass thru. The cable tie passage 3, may be formed during manufacturing in a way that creates a hollow section 10 below the cable tie passage 3. The hollow section 10 allows for a two-piece die mold to create the cable tie passage 3, thus may eliminate the necessity for an elaborate expensive slide tooling within the mold or die. In one embodiment, the cable tie passage 3 has contoured bottom edges 6 to allow the cable tie to better exit the cable tie passage 3 and allows the cable tie to start to bend towards the mounting face 2 and toward the object for a natural cable tie bend and wrap around the object.

Figure 8:
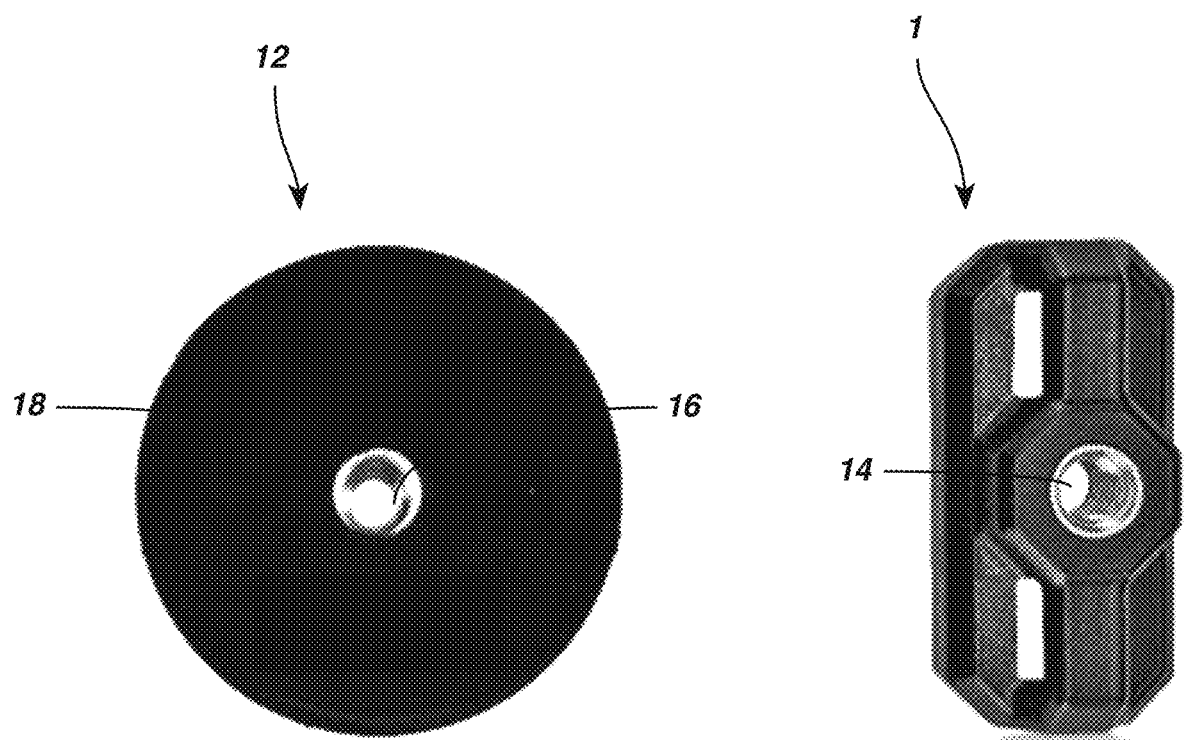
FIG. 8 shows a disassembled view of a body and a magnet of a cable tie mounting adapter according to one embodiment of the present disclosure.

Referring now to FIG. 8, the cable tie mounting adapter may include a magnet mount 12 adapted to be threadably secured to the body 1, such as to a threaded bore 14 formed in the body such that the magnet mount 12 may be removably secured to the body 1. The magnet mount 12 includes a threaded portion 16 extending perpendicular to a plane of a face of a magnet 18 of the magnet mount 12. In one embodiment, the magnet mount 12 is coated in a rubber or plastic such that the magnet 18 does not damage a surface on which the magnet mount 12 is secured.

Figure 9:
FIG. 9 shows a perspective view of a cable tie mounting adapter secured on an object according to one embodiment of the present disclosure.

Embodiments of the cable tie mounting adapter described herein are configured to attach to a consumer product, such as a flashlight, and provide the ability for other handy objects to be connected via a threaded hole formed in the body 1, as shown in FIG. 9. These other handy objects may be a magnet, a hook, a spring clamp, a suction cup, a work stand and others. The cable tie mounting adapter provides new options for attaching, hanging or mounting an object. The cable tie mounting adapter will enable the user to enjoy the benefit of hands-free use and secure convenient mounting of the consumer product. A cable tie mounting adapter would allow objects such as; a hand tool, power tool, portable light, kitchen utensil, and many others, that may not have an integrated hook, belt clip, magnet or threaded hole, the ability to mount to a surface. The cable tie mounting adapter provides the user the ability to attach a hook to hang a flashlight on any hook supporting structure, to attach a magnet for mounting via magnetic attraction to a metal surface or to attach a spring clamp to allow clamping to various shaped objects for mounting. A threaded cable tie mounting adapter will temporarily attach to a suitable object without physically modifying or damaging the object. The installation of the cable tie mounting adapter is preferably accomplished with the use of one or more cable ties. A threaded cable tie mounting adapter is intended to be easily removed by disengaging or cutting the cable ties, in turn, freeing the spent cable ties and the threaded cable tie mounting adapter from the object.

Embodiments of the cable tie mounting adapter may be attached to a water bottle, therefore allowing a magnet to be connected. This combination of water bottle, threaded cable tie mounting adapter could be stuck to virtually any steel object. Example of metal objects to attach to are school gym locker and exercise equipment.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A cable tie mount for supporting an object, the cable tie mount comprising:
    a body including
        a mounting face formed on a first side of the body, the mounting face having a groove arranged along a length of the mounting face,
        a threaded bore formed in a second opposing side of the body, and
        a first cable tie passage formed on the body and configured to receive a cable tie therethrough; and
    a support portion including a threaded portion extending therefrom and configured to threadably engage the threaded bore formed in the second opposing side of the body;
    wherein the body is configured to mount to the object with one or more cable ties, and wherein the body is configured to be threadably secured to the support portion for supporting the object mounted on the body at a desired location.

2. The cable tie mount of claim 1, wherein the support portion further comprises a magnet.

3. The cable tie mount of claim 2, wherein the magnet is coated with one of a rubber or polymer material.

4. The cable tie mount of claim 1, further comprising a second cable tie passage.

5. The cable tie mount of claim 4, wherein the first cable tie passage and the second tie passage are located on opposing sides of the threaded bore formed in the second opposing side of the body.

6. The cable tie mount of claim 1, the first cable tie passage including a top portion, a bottom portion, and opposing side portions for securing a cable tie within the first cable tie passage.

7. The cable tie mount of claim 1, the support portion selected from the group consisting of a threaded eye hook, threaded eye bolt, a threaded bolt, a threaded magnet.

8. The cable tie mount of claim 1, wherein the mounting face is substantially planar.

9. The cable tie mount of claim 1, wherein the mounting face is substantially contoured such that the mounting face conforms to a shape of the object.

10. A cable tie mount for supporting an object, the cable tie mount comprising:
    a body including
        a mounting face formed on a first side of the body, the mounting face having a groove arranged along a length of the mounting face,
        a threaded bore formed in a second opposing side of the body,
        a first cable tie passage formed on the body on a first side of the threaded bore and configured to receive a first cable tie therethrough, and
        a second cable tie passage formed on the body on a second side of the threaded bore and configured to receive a second cable tie therethrough; and
    a support portion including a threaded portion extending therefrom and configured to threadably engage the threaded bore formed in the second opposing side of the body;
    wherein the body is configured to mount to the object with one or more cable ties, and wherein the body is configured to be threadably secured to the support portion for supporting the object mounted on the body at a desired location.

11. A cable tie mount for supporting an object, the cable tie mount comprising:
    a body including
        a mounting face formed on a first side of the body, the mounting face having a groove arranged along a length of the mounting face,
        a threaded bore formed in a second opposing side of the body,
        a first cable tie passage formed on the body on a first side of the threaded bore and configured to receive a first cable tie therethrough, and
        a second cable tie passage formed on the body on a second side of the threaded bore and configured to receive a second cable tie therethrough; and
    a support portion including a magnet and a threaded portion extending therefrom and configured to threadably engage the threaded bore formed in the second opposing side of the body;

wherein the body is configured to mount to the object with one or more cable ties, and wherein the body is configured to be threadably secured to the support portion for supporting the object mounted on the body at a desired location.

\* \* \* \* \*